Feb. 6, 1951 J. DREEBEN 2,540,388
BRAKE SHOE SPRING COMPRESSOR
Filed June 19, 1948

INVENTOR.
JACK DREEBEN
BY
ATTORNEY.

Patented Feb. 6, 1951

2,540,388

UNITED STATES PATENT OFFICE 2,540,388

BRAKE SHOE SPRING COMPRESSOR

Jack Dreeben, Philadelphia, Pa.

Application June 19, 1948, Serial No. 34,022

2 Claims. (Cl. 29—267)

This invention relates to brake shoe spring compressors and more particularly to a compressor employed in connection with the removal of brake pins used on automotive vehicle brakes.

It is the principal object of the present invention to provide a brake shoe spring compressor which is simple and sturdy in its construction and reliable in its action.

It is a further object of the present invention to provide a brake shoe spring compressor with which adequate force may be applied for compressing springs on brake shoe pins for removal and replacement with a minimum of effort on the part of the user.

Other objects and advantageous features of the invention will be apparent from the specification and claims.

Figure 1:
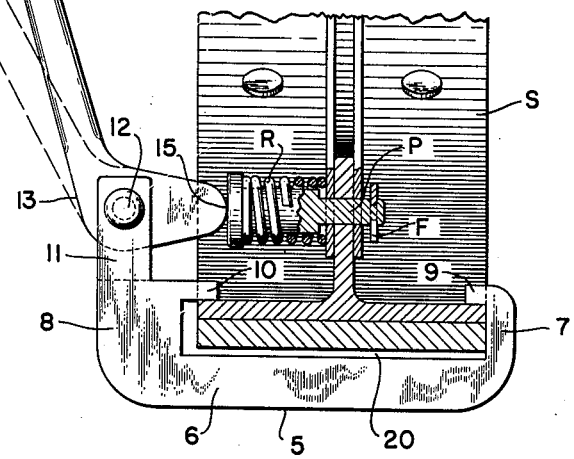
Figure 2:
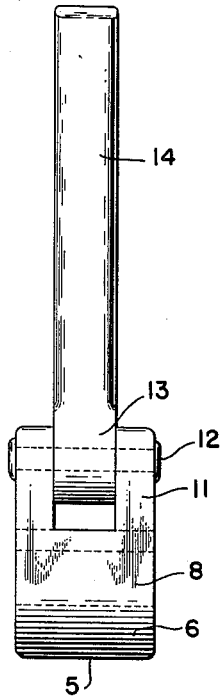

The nature and characteristic features of the invention will be more readily understood from the following description, taken in connection with the accompanying drawings forming part hereof, in which:

Figure 1 is a front elevational view of a spring compressor in accordance with the present invention and showing the manner of use thereof; and Fig. 2 is an end elevational view thereof.

It should, of course, be understood that the description and drawings herein are illustrative merely, and that various modifications and changes may be made in the structure disclosed without departing from the spirit of the invention.

Referring now more particularly to the drawings, the brake spring compressor in accordance with the present invention preferably includes a body portion 5. The body portion 5 is preferably in the form of a rigid C-shaped frame having a back bar 6 with end portions 7 and 8 extending therefrom at right angles. The end portion 7 is provided with a lug 9 parallel to the back bar 6 and the end portion 8 is provided with a lug 10 parallel to the back bar 6 and oppositely disposed with respect to the lug 9 to provide an open sided channel for the reception of a brake shoe S. The facing ends of the lugs 9 and 10 are spaced to permit the insertion, into the channel 20 provided by the back bar 6, the end portions 7 and 8 and the lugs 9 and 10, of a brake shoe S. The body portion 5 is provided with a bifurcated lateral extension 11 for the pivotal mounting, by means of a pin 12, of a compressor lever 13, the fulcrum or pivotal axis being offset from the back bar 6 and the lugs 9 and 10 and to a position in alinement with the longitudinal axis of a pin P, which pin P normally is locked in the brake shoe S by a friction lock F and carries thereon the friction spring R which is to be compressed. The lever 13 preferably includes an actuating arm 14 for manual operation and a cammed end 15 for engagement with the end of the pin P.

The mode of use will now be pointed out. With the lever 13 swung to a position so that the cammed end 15 thereof is out of engagement with the end of the pin P, the body portion 5 is mounted on the brake shoe S with the shoe disposed in the channel 20. Upon movement of the lever 13, the cammed end 15 is brought into engagement with the head of the pin P, thereby forcing the brake shoe S against the abutment provided by the interior face of the end portion 7, and the spring R is compressed to a position such that the friction lock F may be removed. The lever 13 is then swung to a position to permit the withdrawal of the pin P and the removal of the spring R for substitution of a new spring. The pin P, with the new spring thereon, may then be readily compressed by a reversal of the operations just described, the friction lock F applied and the lever 13 moved to a position such that the cammed end 15 is out of engagement with the head of the pin P. The brake shoe S can then be removed from the compressor.

I claim:

1. In a spring compressor for brake shoe springs, a body portion comprising a back bar having normally disposed end portions extending therefrom, integral lugs on each of said end portions in parallel relation to said back bar to provide a C-shaped channel for the reception of a brake shoe, an extension on said back bar at one end thereof, a fulcrum pin in said extension transversely offset from and parallel to said channel, and a lever carried by said pin and having an end portion for spring compressing engagement with a spring pin carried by the brake shoe.

2. In a spring compressor for brake shoe springs, a body portion comprising a back bar having normally disposed end portions extending therefrom, integral lugs on each of said end portions in parallel relation to said back bar to provide a C-shaped channel for the reception of a brake shoe, a bifurcated extension on said back bar at one end thereof, a fulcrum pin in said extension transversely offset from and parallel to said channel, and a lever carried by said pin and having a cam shaped end portion for spring compressing engagement with a spring pin carried by the brake shoe.

JACK DREEBEN.

REFERENCES CITED

The following references are of record in the file of this patent:

UNITED STATES PATENTS

| Number | Name | Date |
| --- | --- | --- |
| 1,821,163 | King | Sept. 1, 1931 |
| 1,895,030 | Elmore | Jan. 24, 1933 |
| 2,178,792 | Holmboe | Nov. 7, 1939 |
| 2,363,350 | Nail | Nov. 21, 1944 |